UNITED STATES PATENT OFFICE.

DINAH J. LOEWENSTEIN, OF NEW ORLEANS, LOUISIANA.

IMPROVEMENT IN THE MANUFACTURE OF FERTILIZERS FROM NIGHT-SOIL.

Specification forming part of Letters Patent No. 129,739, dated July 23, 1872.

*To all whom it may concern:*

Be it known that I, DINAH J. LOEWENSTEIN, of the city of New Orleans, parish of Orleans and State of Louisiana, have invented a new, useful, and Improved Process for Preparing Night Soil for Fertilizing Purposes; and I hereby declare the following to be a full, clear, and correct description of my invention.

The process of the preparation of night-soil, or, more properly, the fecal matter of privy-vaults, to which my improvement relates, is designed to be effected with a view to the concentration and disinfection of the same, and to the end of converting said night-soil or fecal matter into a useful and valuable fertilizer. For the purposes of concentration and reduction as well as of disinfection of the mass of fecal matter, as it usually exists in a privy-vault in a liquid or partially-liquid state, I employ certain chemical agencies, as hereinafter explained, to crystallize or solidify those elements therein existing, which possess the required fertilizing and useful properties, and which for this reason it is desirable to retain; while those elements which do not possess essential fertilizing elements or properties, such as water, are to be evaporated therefrom, so that the remaining substances may be conveniently transportable and thereby rendered available for the purposes for which they may be required. The solidification or crystallization of the ammonia, existing principally in the liquid urine of the privy-vault, is effected by the employment of the vapor or gases of sulphuric, nitric, or muriatic acids, generated by means of steam injected into a suitable receptacle or retort into direct contact with either of the above named acids, whichever may be used for this purpose. The vapors or gases thus generated are conveyed from said receptacle or retort, by means of a pipe or hose, directly into the mass of the fecal matter of the vault, and by this means the ammonia therein existing is precipitated and thereby retained in a more concentrated form, and likewise in a condition divested of those noxious vapors and gases which otherwise render such matters so objectionable to handle and transport, and so detrimental to human health and comfort.

The mass of fecal matter partially concentrated, but thoroughly and effectually disinfected in the manner above described, may now be removed from the vault without difficulty, and employed directly as a fertilizing agent, or mixed with any kind of animal or vegetable manure or other equally valuable substances, such as phosphate of lime, dissolved bone, saline, alkaline, or any other mineral fertilizing agents, with a view to the production of a manure which may be especially adapted to any particular soil for which it may be required.

The combination of the fertilizing agents made as above indicated may now be divested of its moisture, and thereby rendered more portable as well as more durable, by being dried in open metal pans through the agency of steam admitted into direct contact with the outer surface of said pans, and confined thereto by means of an outer sheet or lining of sheet metal, forming a steam-chamber throughout the bottom and sides of said evaporating-pans.

The material thus prepared is highly valuable and useful for fertilizing purposes, as I have amply demonstrated by actual and repeated experiment.

Having described my invention, what I desire to secure by Letters Patent is the following claims:

1. The improved process herein described of concentrating and disinfecting night-soil, or fecal matter of privy-vaults, by the application of vapors or gases of the acids mentioned, generated as described, for the purposes set forth.

2. The combination of night-soil, or fecal matter of privy-vaults, treated as above described, with animal or vegetable manure, or with phosphate of lime, dissolved bone, or with any of the other ingredients named, and the combination thus created to be treated as and for the purposes herein set forth and described.

D. J. LOEWENSTEIN.

Witnesses:
L. J. OLMSTEAD,
H. N. JENKINS.